Figure 6:
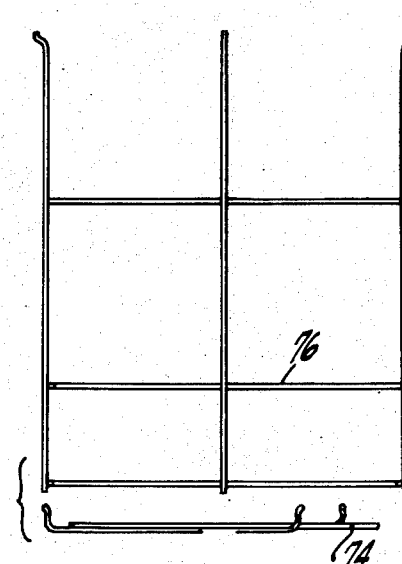

Oct. 8, 1963
L. J. CLINE
3,106,445
HEATED IMMERSION STERILIZER FOR MILKING MACHINE COMPONENTS
Filed Jan. 5, 1962
2 Sheets-Sheet 1
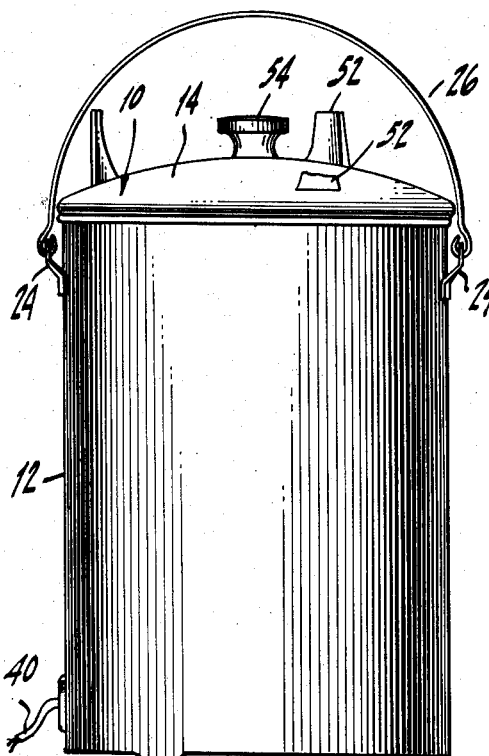
Fig. 1.
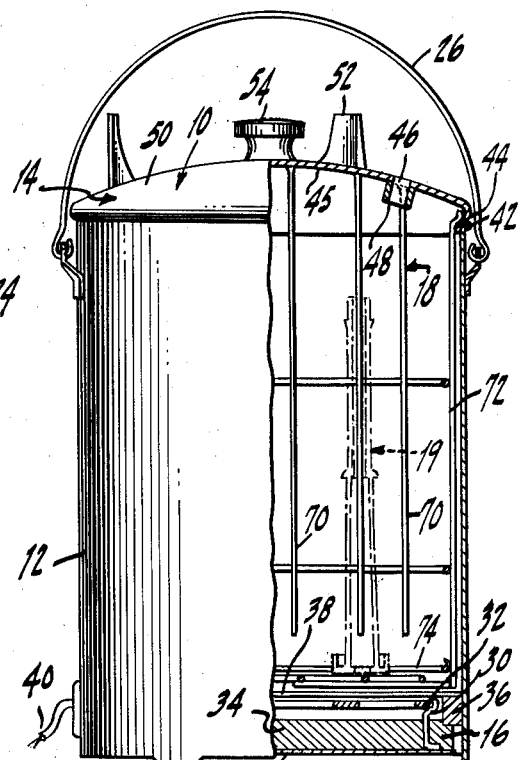
Fig. 2.
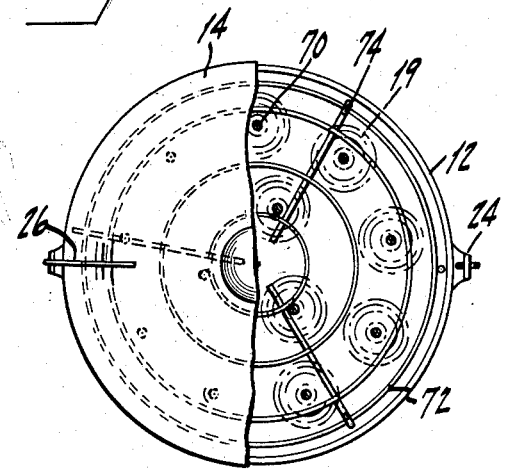
Fig. 3.
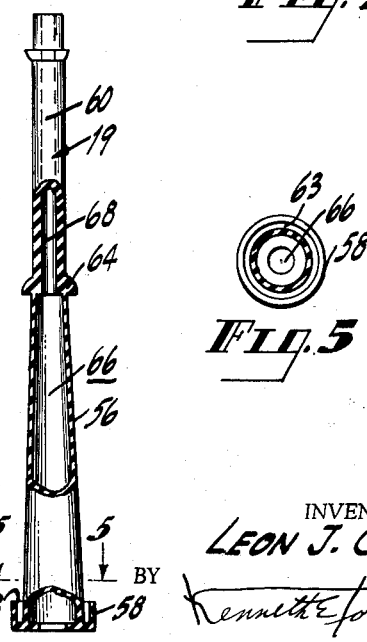
Fig. 4.
Fig. 5
INVENTOR.
LEON J. CLINE
BY
Kenneth E. Forman
Attorney Oct. 8, 1963

L. J. CLINE 3,106,445

HEATED IMMERSION STERILIZER FOR MILKING MACHINE COMPONENTS

Filed Jan. 5, 1962

2 Sheets-Sheet 2

INVENTOR.
LEON J. CLINE
BY
Kenneth E. Forman
Attorney

United States Patent Office 3,106,445
Patented Oct. 8, 1963

3,106,445
HEATED IMMERSION STERILIZER FOR MILKING MACHINE COMPONENTS
Leon J. Cline, R.F.D. 2, Madrid, N.Y.
Filed Jan. 5, 1962, Ser. No. 164,470
3 Claims. (Cl. 21—86)

This invention relates to sterilizers and more particularly to sterilizers for cleaning milking machine inflations.

It has long been recognized that no matter how thoroughly you clean porous inflations with soap and water, they will gradually absorb a certain amount of milk fat. Any neglected inflation will become coated with an accumulation of a soft, greasy material or milkstone deposit and fat, which contains many types of bacteria, some of which may cause mastitis. The fat also reduces the elasticity of the inflation and causes the interior surface of the inflation to become rough thereby cutting its efficiency and resulting in improper milking.

In order to remove the accumulated milk fat, it has heretofore been the practice of farmers to boil the inflations once a week in a solution of lye and water, allowing them to stand overnight and then discarding the solution. They are then washed and rinsed, dried and stored in a cool, dry, dark place for a week. Each farmer usually has two sets of inflations using them on alternate weeks. However, the method of merely placing the inflations in an open container has found to be lacking because there is not sufficient pressure to open up the pores to allow all the milk fat and other contamination to be removed. Also, in storing the inflations it is important to maintain them in an upright position so that when they contract they resume their original shape. This is necessary in order to assure that the inflations will apply an even pressure on the teat, thereby preventing an irritation which might later become infected.

It is therefore an object of this invention to provide a sterilizer which will allow the pores of milking machine inflations to be thoroughly cleaned.

It is another object of this invention to provide a sterilizer which will support inflations during their drying period to insure that they contract to their original shape.

It is a further object of this invention to provide a sterilizer which protects the operator and the surrounding area from the caustic solution used in the sterilizer.

It is still another object of this invention to provide a sterilizer which may be easily disassembled for cleaning purposes.

It is another object of this invention to provide a sterilizer which is economical to manufacture and easy to use.

This invention may be briefly described as a sterilizer having a container for holding a cleaning solution to which is attached a unit for heating the solution. Means are provided within the container for holding a plurality of inflations in an upright position so that a pressure will be built up in the inflation when the solution is heated in order to open up the pores of the inflations thereby allowing any milk fat or other contamination therein to be acted upon and removed.

Figure 7:
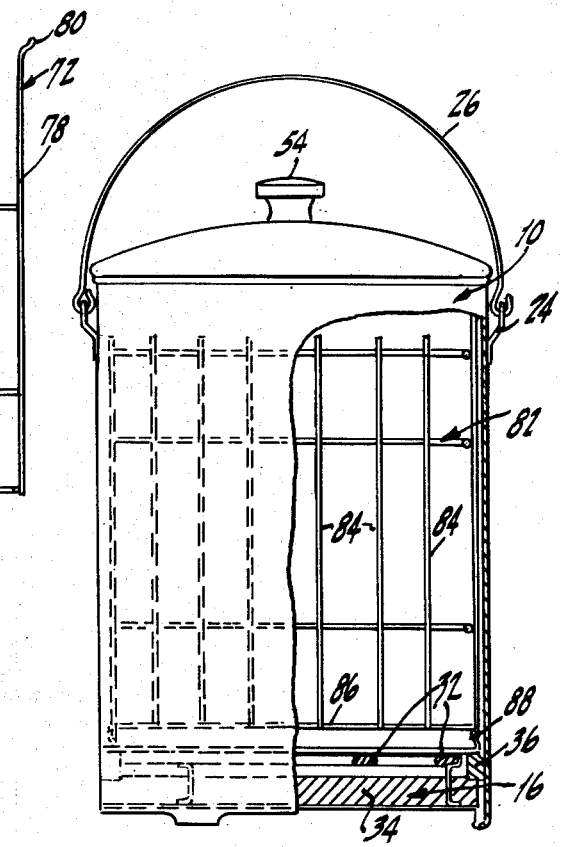
Figure 8:
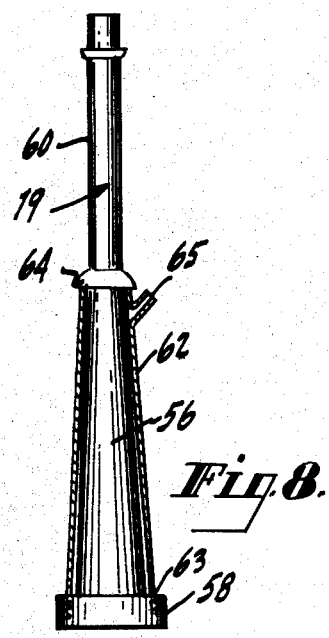
Figure 9:
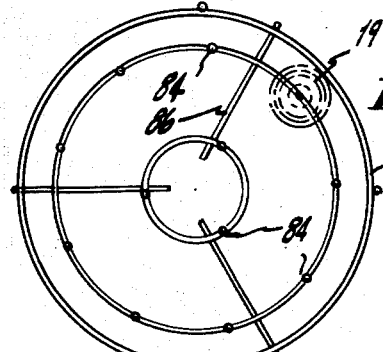

Other objects and advantages of this invention will be apparent from the following description when taken in connection with the following drawings in which:

FIG. 1 is a side elevational view of a sterilizer according to the present invention, FIG. 2 is a side elevational view similar to FIG. 1 but with portions broken away to show the heating unit and inflation holding means, FIG. 3 is a plan view of the sterilizer with a portion of the cover broken away to show the positioning of the inflations in the canister, FIG. 4 is a side elevational view of a milking machine inflation, partly in section, to show the internal openings, FIG. 5 is a section taken along the line 5—5 of FIG. 4, FIG. 6 is a side elevational view of a retaining member secured to the cover of the sterilizer shown in FIG. 2, FIG. 7 is a side elevational view of a sterilizer, partly broken away, to show a modified form of inflation holding means, FIG. 8 is a side view of a milking machine inflation with a portion thereof surrounded by a milking machine sleeve, FIG. 9 is a top view of the inflation holding means illustrated in FIG. 7.

Referring now, to the drawings, there is shown by way of illustration a sterilizer 10 for milking machine inflations 19 comprising, generally, a container 12 having a cover 14, a heating unit 16 and means 18 positioned in the canister 12 for holding the inflations 19 in an upright position.

The container 12 as seen in FIGS. 1, 2 and 7 is preferably circular in shape having a plurality of legs 21 at one end thereof for holding the base plate 28 of the container 12 above a supporting surface thereby allowing air to circulate between the heating unit 16, positioned in the bottom of the container, and a supporting surface. Secured to opposite points on the surface of the container are a pair of hinge members 24 to which is attached a bail 26 for carrying the canister 12 and which can be swung out of the way when not in use. The container can be constructed of any suitable material impervious to caustic solutions, usually metallic and it will be evident that the shape of the container should not be taken as limiting, but merely as illustrative of the preferred embodiment.

Secured within the bottom opening in the container 12 is a heating unit 16 which can be any of a number of different types. As illustrated in FIG. 2, the heating unit 16 comprises a metallic base plate 28 to which is spot welded a number of brackets 30 for holding the heating element 32 which is an ordinary high resistant metallic member. Positioned between the base plate 28 and the heating element 32 is a block of insulating material 34 which causes the heat from the element 32 to be projected upward into the container 12. A second insulating block 36 is positioned between the edge of the element 32 and the inner surface of the canister 12 to perform the same function as material 34.

A plate 38 is attached in water tight relation to the inner surface of the container 12 a short distance above the heating element 16 so that liquid solutions can be placed in the container 12 without coming in contact with the heating unit. A lead wire 40 from the heating element 32 extends through an opening in the container 12 and can be plugged into any source of electrical power.

Positioned within the top opening in the canister 12 is a cover 14 which has a flange 42 extending within the opening and a shoulder 44 resting on the top surface of the container and spaced from the inner surface 45 of the cover 14 for a purpose to be hereinafter described. As opening 46 in the cover 14 serves as a vent for pressure which will be built up by the boiling liquid and in order to prevent the liquid from splashing out through the opening 46, a deflecting plate 48 is welded to the inner surface of the cover in surrounding relationship.

Attached to the outer surface 50 of the cover 14 is a plurality of legs 52, the purpose of which will be later described, and a knob 54 made of some type of insulating material so that the cover can be easily removed when warm.

As heretofore stated, the purpose of the sterilizer 10 is to thoroughly cleanse milking machine inflations 19, one of which is illustrated in FIGS. 4 and 8. The inflation 19 comprises generally, a neck portion 60 and a base portion 56 which terminates at one end in a flange 58. When an inflation 19 is to be used in a milking machine, a metal sleeve or shell 62 is positioned around the base portion 56 with one end extending into the opening 63 between the flange 58 and the outer surface of the base portion 56 and the other end of the sleeve is seated against a built up shoulder 64 at the joinder of the neck and base portions. Both ends of the sleeve 62 are seated so as to be air tight. When the neck of the inflation is attached to a hose from the milking machine and a source of vacuum (not shown) is applied to an opening 65 in the sleeve 62, the inflation 19 is ready to operate and a cow's teat can be placed in the circular opening 66 (see FIG. 4). As the vacuum is applied at spaced intervals, the base portion 56 of the inflation will be forced in and then allowed to expand as the vacuum is released thereby milking the teat. The milk extracted from the teat will pass up through a circular opening 68 in the neck portion 60 to the hose and on to the milking machine container. It will be evident from the above that the only portion of the inflation 19 which the milk contacts is the interior surface of the opening 66 in the base portion 56 and the surface of the opening 68 in the neck portion 60. Since this is the only portion contacted by the milk, it is the area in which the pores must be opened up to allow the butter fat accumulated therein to be removed.

Referring now to FIGS. 2, 3 and 6, there is illustrated rack means 18 for supporting a plurality of inflations 19 in an upright position with their flanged end 58 being positioned near the bottom of the container 12 and the neck portion 60 being pointed toward the cover 14. The rack means 18 consists of a plurality of solid metal holding rods 70, a retaining member 72 and a snap on bottom 74. Each rod 70 is attached to the inner surface 45 of the cover 14 so as to extend down into the canister 12, the spaced relation of each rod being shown in FIG. 7. A dozen inflations are normally considered a set for an average dairyman so in order to accommodate a complete set, the sterilizer 10 has been constructed with 12 rods, but it will be evident that the device could be made with any number of rods 70 or the sterilizer may be used when less than full. As best seen in FIG. 6, the retaining member 72 consists of a plurality of solid metal horizontal 76 and vertical 78 metal strips attached together in spaced relation. Each vertical strip 78 is curved out at one end 80 so as to fit over the shoulder 44 in the cover 14, thereby securing the retaining member to the cover (see FIG. 2). The main function of the retaining member 72 is to support the bottom 74 which in turns holds the inflations 19 on the rods 70 so that when the cover 14 is removed, the inflations will be held on the rods which, as heretofore stated, are attached to the cover 14. If the cover 14 is now turned over and positioned on the legs 52, the inflations 19 will still be supported by the rods 70 and can be left to dry in this position. Since the rods 70 hold the inflations straight during the drying period, it will be evident that they will retract to their original shape thereby accomplishing one of the objects of the invention.

Referring now to FIGS. 7 and 9, a modified form of sterilizer 10 is illustrated which is similar to the unit shown in FIG. 2 except that a different type supporting rack is used which is not secured to the cover 14. Here, the rack 82 consists of an open wire basket 83 which has a plurality of rods 84 attached to and extending up from the bottom surface 86. The basket 83 has a plurality of legs 88 on the bottom surface thereof for supporting the basket 83 above the bottom of the canister 12. It will be evident that the rack 82 in this modified form can perform the same function as the rack illustrated in FIG. 2.

To operate the sterilizer 10, a cleaning solution of lye or other caustic solution and water are placed in the container 12 so that it is approximately half full. In the embodiment illustrated in FIG. 2, a plurality of inflations 19 are placed on the rods 70 extending out from the inner surface of the cover 14 and retaining member 72 and bottom 74 are snapped into place. The rack is then lowered into the container until the cover is properly seated. The heating unit 16 is then turned on and after a period of time the cleaning solution begins to boil. Since the larger openings 66 in the base portion 56 are near the bottom and the constricted openings 68 in the neck portions 60 are near the top of the container 12 pressure is built up within the openings 66 and 68. This pressure opens up the pores of the porous inflation and allows the butter fat therein to be acted upon and removed. During the boiling operation, the solution can be seen spouting out from the tops of the inflations like a gusher. After a sufficient amount of boiling time, the cover 14 with the rack attached is removed from the container and tipped over so as to stand up on the legs 52 thereby holding the inflations 19 for drying. The cover and rack are left in this position for normally a week thereby allowing the rubber to contract and the inflations to return to their normal size and shape.

From the foregoing description it will be apparent that I have provided a sterilizer having a new combination of elements to produce a new result. While I have illustrated and described some forms of the invention, it will, no doubt, be apparent to those skilled in the art that various changes may be made and other forms are possible, all within the spirit of the invention. For example, the rack means 18 may be formed in a number of different shapes all being within the spirit of the invention. Hence, I desire that the foregoing be taken merely as illustrative and not in a limiting sense.

What is claimed is:

1. A sterilizer for milking machine inflations comprising
   (a) an open ended container for holding a liquid;
   (b) means for heating said liquid;
   (c) a cover for said container;
   (d) a plurality of rods attached to said cover and extending into said container for holding inflations in an upright position in said container; and
   (e) means for holding inflations on said rods so that said inflations are removed with said cover.

2. A sterilizer for milking machine inflations comprising
   (a) an open ended container for holding a liquid;
   (b) means for heating said liquid;
   (c) a cover for said container;
   (d) an open sided basket positioned within said container; and
   (e) a plurality of rods attached to and positioned in said basket for holding inflations in an upright position in said container.

3. A sterilizer for milking machine inflations comprising
   (a) an open ended circular container for holding a liquid solution;
   (b) a heating unit attached to the closed end of said container for heating a liquid solution in said container;
   (c) a cover positioned in the open end of said container and having a shoulder around the periphery thereof;
   (d) a plurality of spaced circular rods attached to the inner surface of said cover and extending into said container; and
   (e) an open wire rack releasably secured to the shoulder of said cover and having a bottom for holding inflations on said rods.

References Cited in the file of this patent

FOREIGN PATENTS 558,486    Canada _____ June 10, 1958